(12) United States Patent
Modarres Razavi et al.

(10) Patent No.: US 10,871,545 B2
(45) Date of Patent: Dec. 22, 2020

(54) RADIO NETWORK NODE, LOCATION NODE, WIRELESS DEVICE AND METHODS PERFORMED THEREIN FOR REPORTING MEASURED POSITIONING INFORMATION

(71) Applicant: Telefonaktiebolaget LM Ericsson (publ), Stockholm (SE)

(72) Inventors: Sara Modarres Razavi, Linköping (SE); Åke Busin, Sollentuna (SE); Fredrik Gunnarsson, Linköping (SE); Olof Liberg, Stockholm (SE); Xingqin Lin, Santa Clara, CA (US); Gino Masini, Stockholm (SE); Henrik Rydén, Solna (SE); Yutao Sui, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 16/482,755

(22) PCT Filed: Dec. 29, 2017

(86) PCT No.: PCT/SE2017/051360
§ 371 (c)(1),
(2) Date: Aug. 1, 2019

(87) PCT Pub. No.: WO2018/143859
PCT Pub. Date: Aug. 9, 2018

(65) Prior Publication Data
US 2019/0353746 A1    Nov. 21, 2019

Related U.S. Application Data

(60) Provisional application No. 62/454,082, filed on Feb. 3, 2017.

(51) Int. Cl.
*G01S 5/02* (2010.01)
*G01S 1/20* (2006.01)
(Continued)

(52) U.S. Cl.
CPC .............. *G01S 5/0236* (2013.01); *G01S 1/20* (2013.01); *G01S 5/0231* (2013.01); *G01S 5/10* (2013.01); *H04L 5/005* (2013.01); *H04W 64/006* (2013.01)

(58) Field of Classification Search
CPC .... G01S 5/0205; G01S 5/0226; G01S 5/0236; G01S 5/0231; G01S 5/10; G01S 1/20;
(Continued)

(56) References Cited

U.S. PATENT DOCUMENTS

| 10,120,060 B2* | 11/2018 | Jain ........................ G01S 5/0263 |
| 2008/0096527 A1* | 4/2008 | Lamba .................... G01S 19/05 |
| | | 455/411 |

(Continued)

FOREIGN PATENT DOCUMENTS

| WO | 2012 023893 A1 | 2/2012 |
| WO | 2015 023224 A2 | 2/2015 |
| WO | 2016 163943 A1 | 10/2019 |

OTHER PUBLICATIONS

PCT International Preliminary Report on Patentability for International application No. PCT/SE2017/051360—dated Apr. 9, 2019.
(Continued)

*Primary Examiner* — George Eng
*Assistant Examiner* — Hung K Du
(74) *Attorney, Agent, or Firm* — Baker Botts, LLP

(57) ABSTRACT

Embodiments herein relate to a method performed by a wireless device (10) for handling positioning of the wireless device in a wireless communications 5 network (1). The wireless device (10) receives assistance data from a location
(Continued)

node (15), or a radio network node (12), in the wireless communications network, wherein the assistance data comprises a positioning configuration comprising a start and/or stop information indicating when positioning reference signal, PRS, transmissions from the radio network node are started and/or ended. The wireless device measures, based on the assistance data, a positioning information of PRSs; and transmits the measured positioning information to the location node or the radio network node.

20 Claims, 10 Drawing Sheets

(51) Int. Cl.
*G01S 5/10* (2006.01)
*H04L 5/00* (2006.01)
*H04W 64/00* (2009.01)
*H04W 24/10* (2009.01)

(58) Field of Classification Search
CPC ... H04W 64/00; H04W 64/006; H04W 24/10; H04L 5/005
See application file for complete search history.

(56) References Cited

U.S. PATENT DOCUMENTS

| 2012/0231809 A1* | 9/2012 | Siomina | H04W 64/00 455/456.1 |
| 2014/0349677 A1* | 11/2014 | Xiao | G01S 5/0226 455/456.1 |
| 2015/0296359 A1* | 10/2015 | Edge | G01S 1/042 455/404.2 |
| 2016/0195601 A1* | 7/2016 | Siomina | G01S 5/0205 455/456.1 |

OTHER PUBLICATIONS

PCT International Search Report for International application No. PCT/SE2017/051360—dated Mar. 7, 2018.

PCT Written Opinion of the International Searching Authority for International application No. PCT/SE2017/051360—dated Mar. 7, 2018.

\* cited by examiner ns and this work continues for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

RADIO NETWORK NODE, LOCATION NODE, WIRELESS DEVICE AND METHODS PERFORMED THEREIN FOR REPORTING MEASURED POSITIONING INFORMATION

PRIORITY

This nonprovisional application is a U.S. National Stage Filing under 35 U.S.C. § 371 of International Patent Application Serial No. PCT/SE2017/051360 filed Dec. 29, 2017 and entitled "RADIO NETWORK NODE, LOCATION NODE, WIRELESS DEVICE AND METHODS PERFORMED THEREIN FOR REPORTING MEASURED POSITIONING INFORMATION" which claims priority to U.S. Provisional Patent Application No. 62/454,082 filed Feb. 3, 2017 both of which are hereby incorporated by reference in their entirety.

TECHNICAL FIELD

Embodiments herein relate to a radio network node, a location node, a wireless device and methods performed therein. In particular, embodiments herein relate to positioning of the wireless device in a wireless communications network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas also referred to as cells or cell areas, which may also be referred to as a beam or a beam group, with each service area or beam group being served or controlled by a radio network node such as a radio access node e.g., a Wi-Fi access point or a radio base station (RBS), which in some networks may also be denoted, for example, a gNodeB, "NodeB" or "eNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP)

The Internet of Things (IoT) is a vision for the future world where everything that can benefit from a connection will be connected. Cellular technologies are being developed or evolved to play an indispensable role in the IoT world, particularly e.g. machine type communications (MTC). MTC is characterized by lower demands on data rates than, for example, mobile broadband, but with higher requirements on e.g. low cost device design, better coverage, and ability to operate for years on batteries without having to charge or replace the batteries. To meet IoT design objectives, 3GPP has standardized Narrowband IoT (NB-IoT) in Release 13 that has a system bandwidth of 180 kHz and targets improved coverage, long battery life, low complexity communication design, and network capacity that is sufficient for supporting a massive number of wireless devices.

To further increase the market impact of further enhanced MTC (FeMTC) and NB-IoT, improving narrowband support for positioning wireless devices has been agreed to be a key aspect of both of these types of devices in Release 14. The enhancement will be designed to maintain an ultra-low cost and complexity of these wireless devices where appropriate, as well as the coverage and capacity of the network.

Besides NB-IoT, LTE Release 13 also introduced a wireless device category M1 which addresses wireless devices with somewhat more demanding MTC applications. Wireless device category M1 is associated with a maximum channel bandwidth of 6 Physical Resource Blocks (PRB), corresponding to 1.08 MHz excluding guard bands or 1.4 MHz including guard bands, which can be compared to 1 PRB for NB-IoT wireless devices or 100 PRBs for LTE wireless device of higher categories. Furthermore, 3GPP has initiated an LTE Release 14 work item on "Further enhanced MTC" (FeMTC) where a wireless device type based on wireless device category M1 with a maximum channel bandwidth of approximately 25 PRBs, corresponding to 4.5 MHz excluding guard bands and 5 MHz including guard bands, will be specified in order to address even more demanding applications. In this work item, Observed Time Difference of Arrival (OTDOA) improvements with respect to positioning accuracy, wireless device complexity and power consumption for these wireless device such as 6-PRB and 25-PRB wireless devices, are also being considered for standardization.

Both NB-IoT and FeMTC are candidates to provide IoT services in an unlicensed spectrum. In this case the technologies need to be adapted to cater for operation in accordance with national or regional regulations. Such regulations may e.g. limit the downlink transmission time and capacity through the introduction of duty cycle requirements. In Europe, the European Telecommunications Standards Institute (ETSI) is e.g. mandating a 10% duty cycle for all transmitters operating in the unlicensed sub-GHz frequency bands.

Location-based services and emergency call positioning drive the development of positioning in wireless communication networks. Positioning support in Third Generation Partnership Project Long Term Evolution (3GPP LTE) was introduced in Release 9. This enables operators to retrieve position information for location-based services and to meet regulatory emergency call positioning requirements.

Positioning in LTE is supported by the architecture shown in FIG. 1, with direct interactions between a wireless device and a location node e.g. an Evolved Serving Mobile Location Center (E-SMLC) using a LTE Positioning Protocol (LPP). Moreover, there are also interactions between the location node and a radio network node, such as a eNodeB (eNB), via the LPPa protocol, and to some extent also interactions between the eNodeB and the wireless device via the Radio Resource Control (RRC) protocol. Positioning requests may come from a wireless device, a Mobility Management Entity (MME) or a Gateway Mobile Location Centre (GMLC).

The following positioning techniques are considered in LTE:
  Enhanced Cell ID (E-CID). Essentially cell ID information to associate the wireless device to the serving area of a serving cell, and then additional information to determine a finer granularity position.
  Assisted Global Navigation Satellite Systems (GNSS). GNSS information retrieved by the wireless device, supported by assistance information provided to the wireless device from E-SMLC.
  OTDOA. The wireless device estimates the time difference of reference signals from different base stations and sends to the E-SMLC for multilateration.
  Uplink Time Difference of Arrival (UTDOA). The wireless device is requested to transmit a specific waveform that is detected by multiple location measurement units (e.g. an eNB) at known positions. These measurements are forwarded to E-SMLC for multilateration. Multilateration is a surveillance technique based on the measurement of the difference in distance to two stations at known locations by broadcasting signals at known times.

OTDOA has been introduced in 3GPP release 9 as a downlink (DL) positioning method. As illustrated in FIG. 2, OTDOA in LTE is based on the wireless device measuring the time of arrival (TOA) of signals received from e.g. three radio network nodes. The wireless device measures the relative difference between a reference cell and another specific cell, defined as reference signal time difference (RSTD) measurement. Every such RSTD determines a hyperbola and the intersection point of these hyperbolas may be considered as the position of the wireless device. Here, the reference cell is selected by the wireless device and the RSTD measurement can be performed on an intra-frequency cell, i.e. reference cells/neighbor cells that are on the same carrier frequency as the serving cell, or an inter-frequency cell, i.e. at least one of reference cell/neighbor cell is on a different carrier frequency from the serving cell.

OTDOA is a supported method for FeMTC wireless devices, and it has also been recently supported in Rel.14 as a positioning candidate for NB-IoT. Therefore, some new agreements and requirements may be set for positioning support of these wireless devices.

Transmitting Positioning Reference Signals (PRS) for OTDOA occupies significant radio resources mainly since Low Interference Subframes (LIS) are applied implying that no DL data is scheduled in subframes used for PRS. Moreover, for NB-IoT to obtain sufficient measurement accuracy it may be necessary to transmit PRSs in a large number of DL subframes, which would consume a significant amount of DL radio resources—much more than what was required for legacy LTE. As an example for a 10 MHz LTE network it is found sufficient to configure PRS transmissions such that around 0.5% of the DL capacity is used while for NB-IoT simulations indicate a need to configure PRS transmissions to use up to 50% of DL capacity. Furthermore, high number of PRS transmissions increases the energy consumption of the wireless communications network.

Configuring, enabling and disabling PRS transmissions in radio network nodes may typically be performed via an Operations And Management (OAM) node, which may also coordinate an E-SMLC configuration. A typical "latency" value for positioning measurements is expected to be 10-20 s in most cases; this should include performing PRS configuration, wireless device configuration, and wireless device measurement reporting. The typical "reaction time" for an OAM action into the RAN, when taken into account for the above NB-IoT use, may be too slow, resulting in either a delay in positioning measurements, or in a waste of radio resources used.

In e.g. the unlicensed frequency domain, a duty cycle limitation limits the available DL radio resources. All transmissions may then be optimized to provide services only exactly when requested. The above described inflexibility in terms of enabling and disabling PRS transmission stands in contradiction to this requirement and challenges the possibility to perform positioning, e.g. OTDOA positioning, based e.g. for NB-IoT in the unlicensed frequency domain.

SUMMARY

An object herein is to provide a mechanism that localizes or positions a wireless device in a wireless communications network in an efficient manner.

According to an aspect the object is achieved by providing a method performed by a wireless device for handling positioning of the wireless device in a wireless communications network. The wireless device receives assistance data from a location node or a radio network node in the wireless communications network. The assistance data comprises a positioning configuration comprising a start and/or stop information indicating when PRS transmissions from the radio network node are started and/or ended. The wireless device measures, based on the assistance data i.e. taking the start and/or stop information into account, a positioning information of PRSs, such as RSTD measurements on the PRSs. The wireless device then transmits the measured positioning information to the location node or the radio network node.

According to another aspect the object is achieved by providing a method performed by a location node for handling positioning of a wireless device in a wireless communications network. The location node initiates a negotiation of a positioning configuration with one or more radio network nodes, wherein the positioning configuration comprises a start and/or stop information indicating when PRS transmissions from a radio network node are started and/or ended. The location node further transmits, once the positioning configuration has been agreed with the one or more radio network nodes, assistance data to the wireless device, wherein the assistance data comprises the negotiated positioning configuration comprising the start and/or stop information.

According to yet another aspect the object is achieved by providing a method performed by a radio network node for handling positioning of a wireless device in a wireless communications network. The radio network node negotiates, with a location node and/or another radio network node, a positioning configuration, wherein the positioning configuration comprises a start and/or stop information indicating when PRS transmissions from the radio network node are started and/or ended. The radio network node further transmits PRSs in accordance with the negotiated positioning configuration.

It is furthermore provided herein a computer program comprising instructions, which, when executed on at least one processor, cause the at least one processor to carry out any of the methods above, as performed by the wireless device, location node, or the radio network node. It is additionally provided herein a computer-readable storage medium, having stored thereon a computer program comprising instructions which, when executed on at least one processor, cause the at least one processor to carry out the method according to any of the methods above, as performed by the wireless device, location node, or the radio network node.

According to still another aspect the object is achieved by providing a wireless device for handling positioning of the wireless device in a wireless communications network. The wireless device is configured to receive assistance data from a location node, or a radio network node, in the wireless communications network. The assistance data comprises a positioning configuration comprising a start and/or stop information indicating when PRS transmissions from the radio network node are started and/or ended. The wireless device is further configured to measure, based on the assistance data, a positioning information of PRSs; and to transmit the measured positioning information to the location node or the radio network node.

According to still yet another aspect the object is achieved by providing a location node for handling positioning of a wireless device in a wireless communications network. The location node is configured to initiate a negotiation of a positioning configuration with one or more radio network nodes, wherein the positioning configuration comprises a start and/or stop information indicating when PRS transmissions from a radio network node are started and/or ended. The location node is further configured to transmit, once the positioning configuration has been agreed with the one or more radio network nodes, assistance data to the wireless device, wherein the assistance data comprises the negotiated positioning configuration comprising the start and/or stop information.

According to a further aspect the object is achieved by providing a radio network node for handling positioning of a wireless device in a wireless communications network. The radio network node is configured to negotiate with a location node and/or another radio network node, a positioning configuration, wherein the positioning configuration comprises a start and/or stop information indicating when PRS transmissions from the radio network node are started and/or ended. The radio network node is further configured to transmit positioning reference signals in accordance with the negotiated positioning configuration.

An advantage of embodiments herein is to dynamically control the PRS transmissions by informing the wireless device when PRS transmissions from the radio network node are started and/or ended in order to efficiently use the downlink sub-frames for positioning purpose. Thus, embodiments herein provide an efficient manner to localize or position a wireless device in a wireless communications network.

BRIEF DESCRIPTION OF THE DRAWINGS

Embodiments will now be described in more detail in relation to the enclosed drawings, in which.

DETAILED DESCRIPTION

Figure 1:
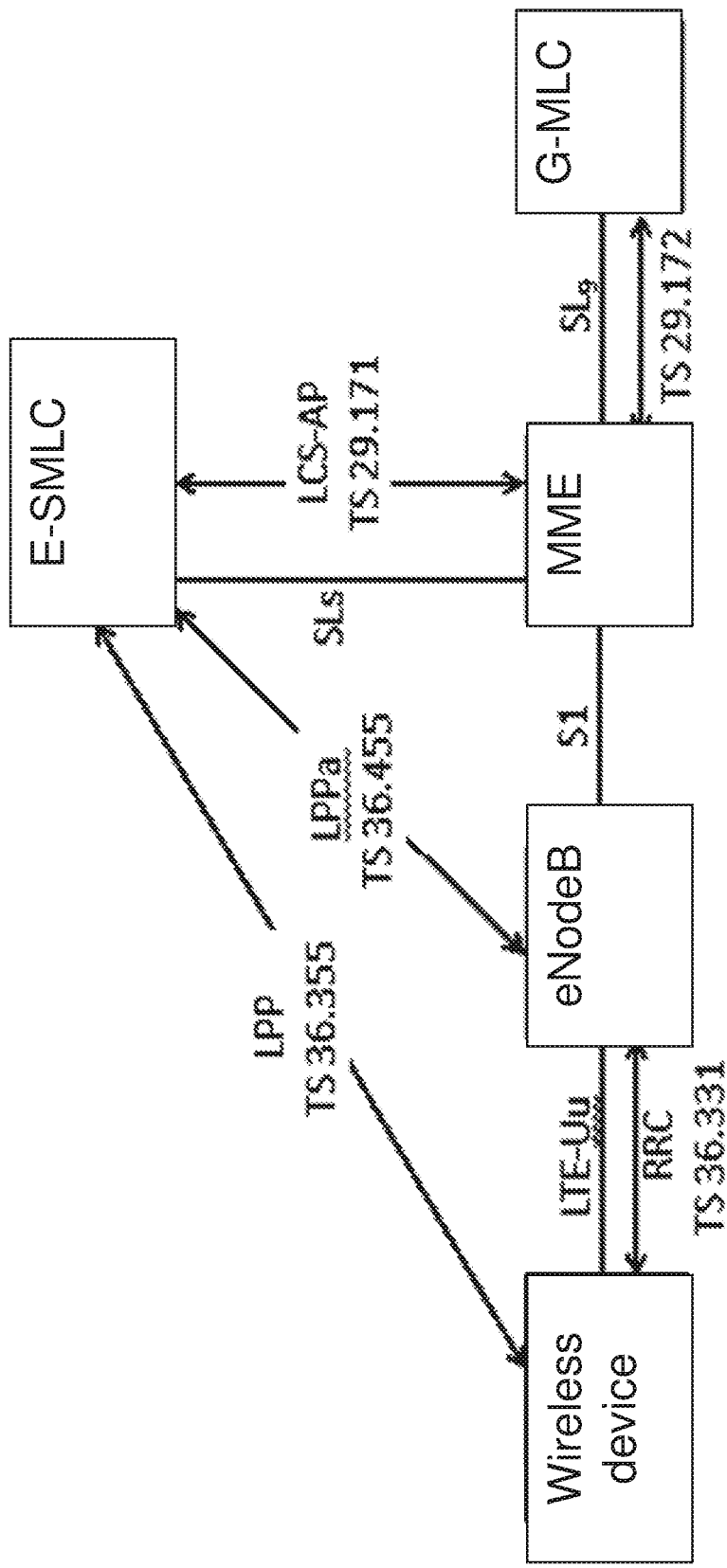
FIG. 1 is a schematic overview depicting an LTE positioning architecture according to prior art.
Figure 2:
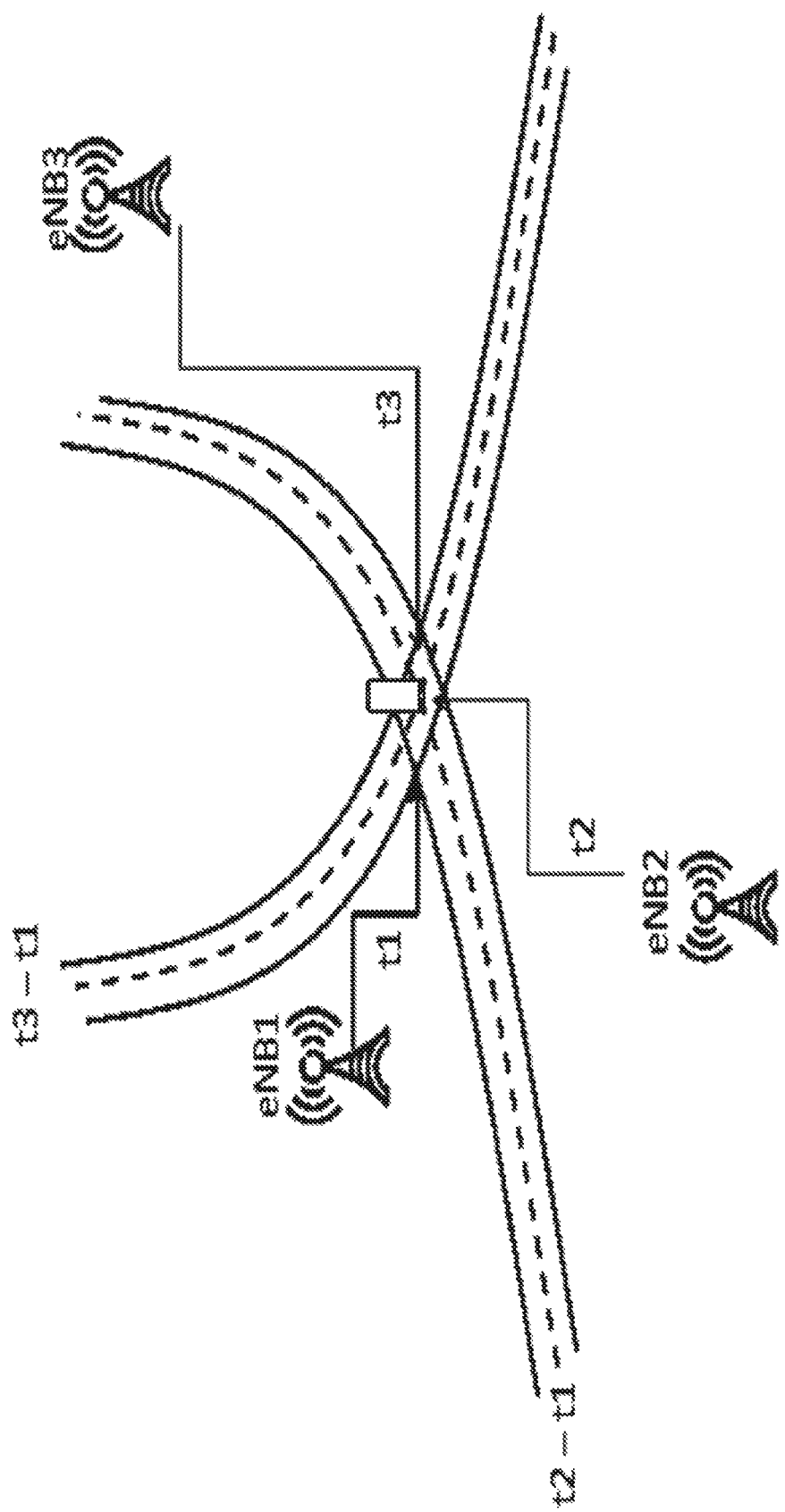
FIG. 2 is a schematic overview depicting OTDOA position estimation based on multilateration of the RSTD measurements according to prior art.
Figure 3:
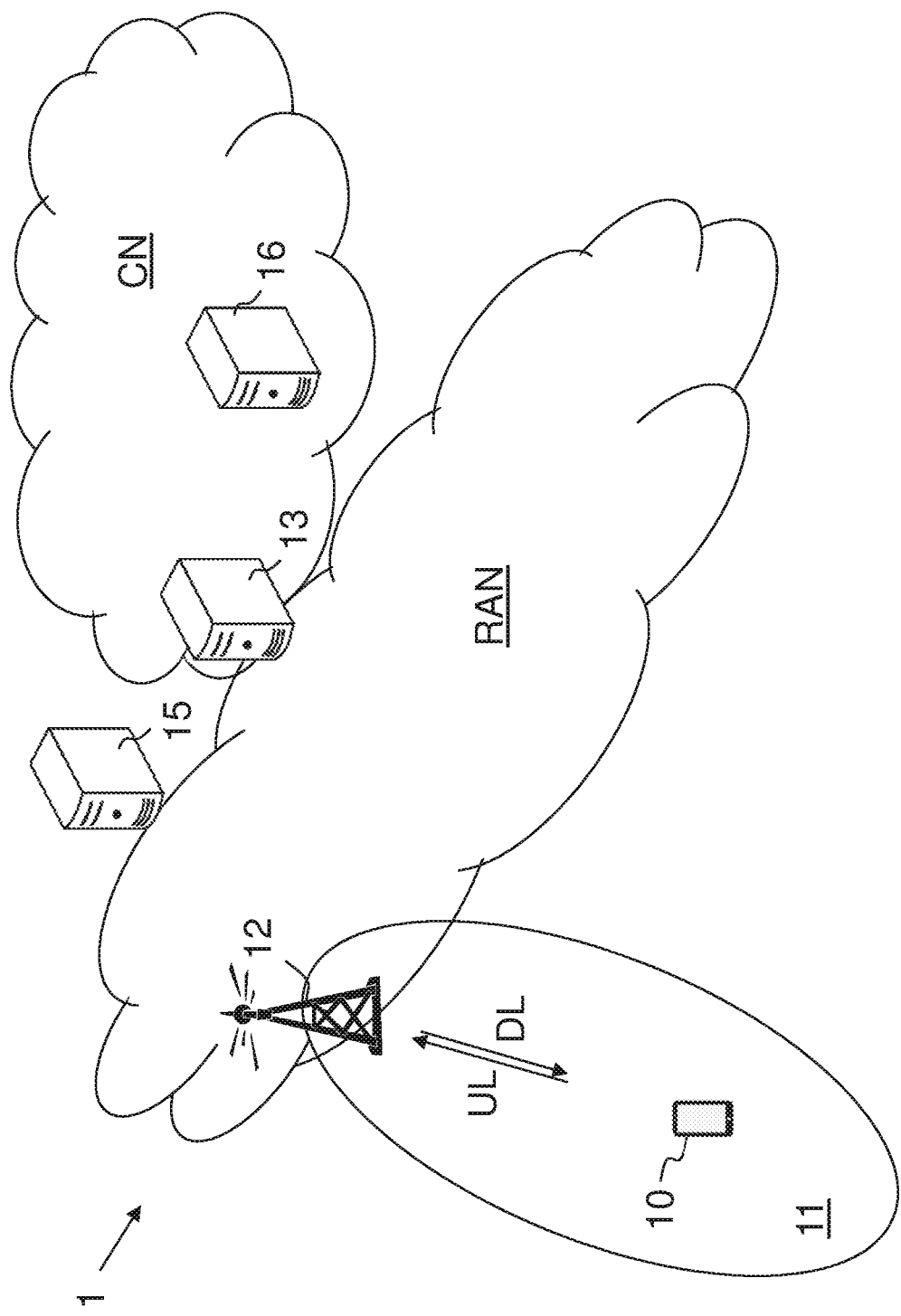
FIG. 3 is a schematic diagram depicting a wireless communications network according to embodiments herein.

Embodiments herein relate to wireless communications networks in general. FIG. 3 is a schematic overview depicting a wireless communications network 1. The wireless communications network 1 comprises one or more RANs and one or more CNs. The wireless communications network 1 may use one or a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a NB-IoT or FeMTC context, however, embodiments are also applicable in further development of the existing or future wireless communications networks such as e.g. 5G, and WCDMA.

In the wireless communications network 1, a wireless device 10, such as a mobile station, a non-access point (non-AP) station (STA), a STA, a user equipment and/or a wireless terminals, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNodeB), a gNodeB, a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 may be referred to as a serving radio network node and communicates with the wireless device 10 with Downlink (DL) transmissions to the wireless device 10 and Uplink (UL) transmissions from the wireless device 10.

The wireless communications network 1 may comprise a controlling network node 13 such as a Mobility Management Entity (MME), a Serving General Packet Radio Service (GPRS) Support Node (SGSN), a server keeping track of wireless devices, or similar. The controlling network node 13 controls or manage wireless devices in service areas in the wireless communications network 1.

The wireless communications network 1 may further comprise a location node 15 such as a e-SMLC for positioning wireless devices or assisting in positioning wireless devices in the wireless communications network.

The wireless communications network 1 may further comprise a network node 16 such as a an OAM node, a gateway, a location controlling node, a Gateway Mobile Location Centre (GMLC) configured to retrieve location or position of wireless devices in wireless communications network 1. It should be noted that the controlling network node 13 is also an example of a network node 16.

A positioning request may be initiated from the network side, i.e., the network would like to know the position of the wireless device 10, or the positioning request can be initiated from the wireless device 10, i.e., the user would like to know its position.

To get sufficient positioning accuracy, the PRSs or Narrowband PRSs (NPRS) may be transmitted in many subframes. The NPRS transmissions may even occupy around 50% of the downlink capacity of an NB-IoT carrier carrying NPRS transmissions. Of course, using 50% of downlink capacity only for the positioning purpose is not acceptable. Thus it is reasonable to dynamically control PRS configuration, which in embodiments herein means turning the PRS transmissions on and off according to the dynamics of positioning requests in the network. For NB-IoT or FeMTC, it is much more critical than for legacy LTE to be able to switch on PRS transmissions, such as NPRS transmissions, only when a positioning measurement is requested, and switch it off after.

PRS configuration may comprise one or more of:
PRS bandwidth
Number of consecutive DL frames (N_PRS)
PRS configuration index (I_PRS)
PRS periodicity (T_PRS)
PRS subframe offset (Delta_PRS)
PRS muting sequence length
PRS muting sequence Usually the PRS configuration parameters of the radio network node 12 may probably not need to be changed on the fly. The main impacting factors (typically network deployment and NB-IoT device characteristics) may be assumed to be reasonably under operator control. The PRS configuration may continue to be handled in a semi-static way by the OAM.

In a more complex network, in which the network behavior changes drastically and dynamically over time, it may be assumed that the PRS configuration can also be changed on the fly, meaning that the location node 15 may send an update of the new configured value for each of the PRS parameters to the radio network node 12, and also assist the wireless device with the new setting parameters. In one embodiment the radio network node 12 may acknowledge the ability of changing the PRS configuration parameter setting to the location node 15 prior to any assistance data sent to the wireless device 10.

Embodiments herein switch on or off PRS transmissions as needed through network signaling, using e.g. pre-configured PRS configurations. Thus, embodiments herein negotiate a positioning configuration, e.g. a PRS configuration, comprising a start and/or stop information, and send related assistance data to the wireless device 10 with the positioning configuration. Furthermore, embodiments herein also relate to transmission and/or measurements on PRS according to the start and/or stop information. In all cases, the assistance data thus includes the positioning configuration comprising the start and/or stop information indicating when PRS transmission are started and/or stopped.

Some advantages of the embodiments herein can be summarized as follows:
Avoiding wasting downlink subframes at the times when there is no positioning request implies that
  a. The downlink subframes may be used for other signals
  b. The energy consumption of the network decreases
To reduce the overall overhead of e.g. OTDOA positioning method for e.g. IoT devices.
To provide an efficient and fast method for providing on-demand PRS transmissions.
To have a solution which covers the multivendor deployments.

The method may be triggered by a positioning request from the wireless device 10, the radio network node 12 or the network node 16 such as a Mobility Management Entity (MME) or a Gateway Mobile Location Centre (GMLC). The embodiments provided herein may be implemented for e.g. the NB-IoT devices due to limited available radio resources.

According to embodiments herein PRSs may be transmitted only when there is a need for e.g. OTDOA positioning measurements. The location node 15 may coordinate OTDOA measurement for multiple adjacent wireless devices, e.g. multiple wireless devices, being positioned adjacent one another, may use the same occasion of PRS transmission. Thus, embodiments herein efficiently use the DL subframes for positioning of wireless devices, such as NB-IoT devices, and do not to waste radio resources in times where no positioning of wireless devices has been requested.

Figure 4:
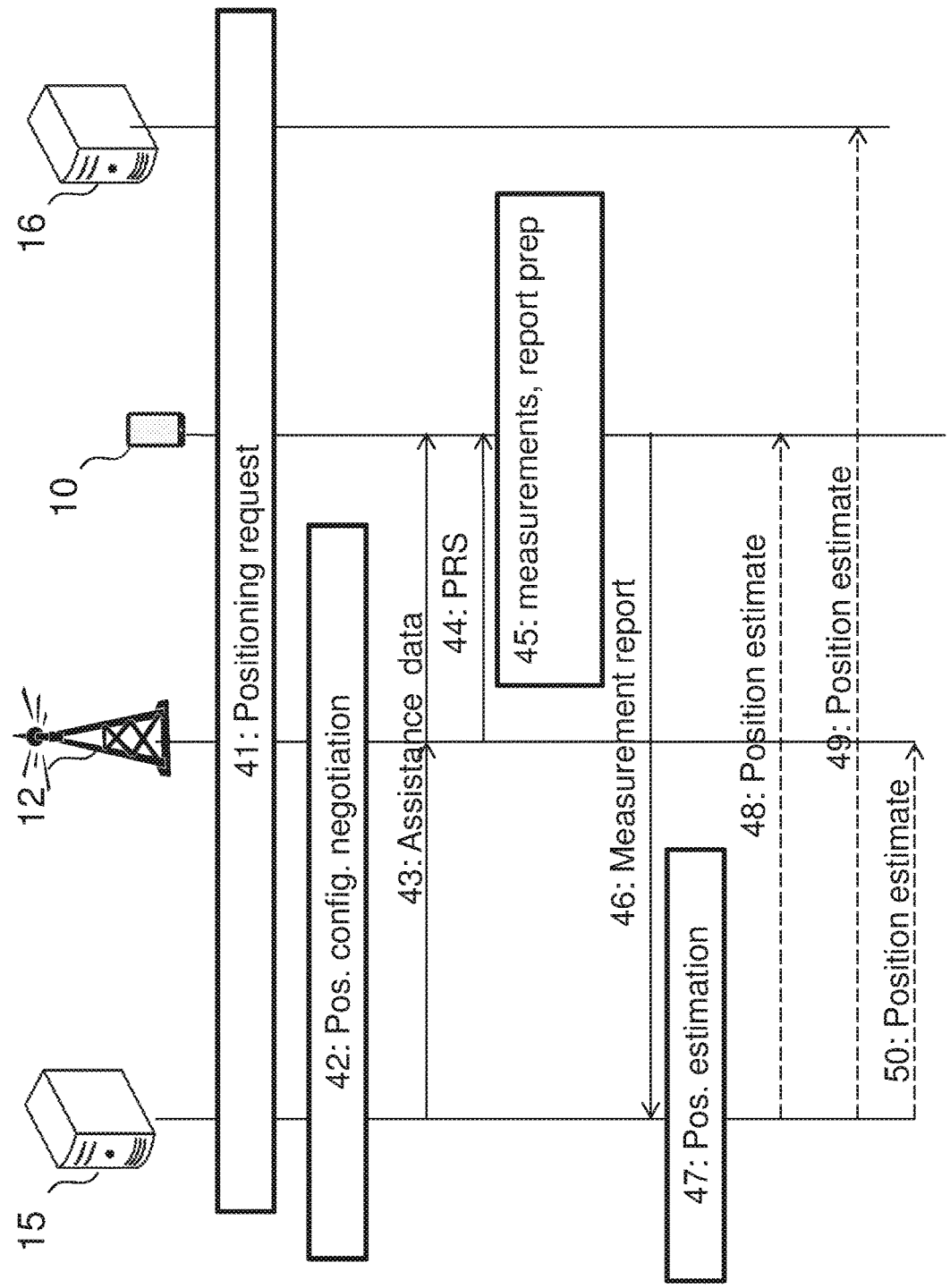
FIG. 4 is a combined flowchart and signalling scheme according to embodiments herein.

FIG. 4 is a combined flowchart and signaling scheme according to embodiments herein.

Action 41. A positioning request has been obtained, e.g. from the wireless device 10 or from the network node 16, which positioning request is associated with the specific wireless device 10. Optionally, positioning requests have been received associated to several wireless devices. This indicates to the location node 15 a need to negotiate a positioning configuration for the radio network node 12.

Action 42. In some embodiments, the location node 15 may negotiate with one or more radio network nodes and may decide the positioning configuration and then communicate the decided positioning configuration to the one or more radio network nodes such as the radio network node 12. The positioning configuration includes the start and/or stop information indicating when to start PRS transmissions and/or when to stop PRS transmissions, and the radio network node 12 may confirm the positioning configuration back to the location node 15. Alternatively or additionally, the radio network node 12 may, during the negotiation with the location node 15, indicate shortage of radio resources, and may in that case optionally propose a later start time of the PRS transmissions as a response to the received positioning configuration. The radio network node 12 may base the response on an utilization of its data channel e.g. Narrowband Physical Downlink Shared Channel (NPDSCH), for NB-IoT wireless devices. For example, if the radio network node 12 has a high utilization in the data channel and does not want to reduce the usage of the radio resources of the data channel in favor of PRSs, the radio network node 12 reports a negative acknowledgment in a response. Additionally or alternatively, the radio network node 12 may base the decision on an energy consumption measure, the radio network node 12 can for example transmit a negative acknowledgement in case of low energy consumption requirements, e.g. low battery level. The radio network node 12 may negotiate the positioning configuration (comprising the start and/or stop information) with neighboring radio network nodes, and may inform the location node 15 of the negotiated positioning configuration.

In some embodiments, the location node 15 may coordinate positioning of multiple wireless devices in a same area e.g. by putting positioning session on hold such if possible several wireless devices can share PRS occasions. This is particularly needed if the rate of positioning per cell goes over a threshold in which such PRS should always be on. This may introduce a slack or a time interval between wanted response time and needed time to measure RSTD.

Action 43. The location node 15 sends assistance data (and e.g. a positioning request) to the wireless device 10, which assistance data comprises the positioning configuration comprising the start and stop information.

The location node 15 may also send "PRS on", e.g. a command over LPPa, to the radio network nodes to which the serving cell and/or the neighbor cells belong. This command may include a "PRS start/stop" information. The initiation of the positioning configuration transmission may thus be implemented as a PRS ON signal to the radio network node 12, for example via LPPa.
For initiation of the PRS transmission the following may be performed:
  a. Reuse the current LPPa OTDOA Information Exchange procedure, with an extension including a "PRS start time" and/or "PRS stop time" information element (IE) added into the information; and/or
  b. Introduce a dedicated procedure, e.g. a "OTDOA PRS Transmission Start/Stop" signalling.

For option a, if the radio network node 12 receives an OTDOA INFORMATION REQUEST message with the extension, the radio network node 12 considers the included information as PRS transmission start and/or stop time, and then responds according to the current specification. For option b, the impact on LPPa may be higher.

In some embodiments, wherein the positioning configuration sent to the radio network node 12 and/or the wireless device 10 does not include a stop information, the location node 15 may send an abort message to the radio network node 12 and/or the wireless device 10 in order to stop PRS transmissions and/or the measurements. It can be implemented as a PRS OFF or ABORT PRS message via LPPa/LPP.

Action 44. The radio network node 12 transmits PRSs based on the positioning configuration. E.g. the radio network node 12 initiates transmission of PRSs at a time indicated by the positioning configuration and/or may stop PRSs transmissions at an end time indicated by the positioning configuration negotiated with the location node 15 or radio network nodes.

Action 45. The wireless device 10 then performs the measurements, e.g.
RSTD measurements, and may prepare or create the report or measurement report.

Action 46. The wireless device 10 then transmits the positioning information e.g. measurements to the location node 15.

Action 47. The location node 15 may then estimate the position of the wireless device 10 based on the received positioning information or measurements.

Action 48. The location node 15 may transmit the position estimate to the wireless device 10.

Action 49. Alternatively or additionally, the location node 15 may transmit the position estimate to the network node 16.

Action 50. Alternatively or additionally, the location node 15 may transmit the position estimate to the radio network node 12.

Figure 5:
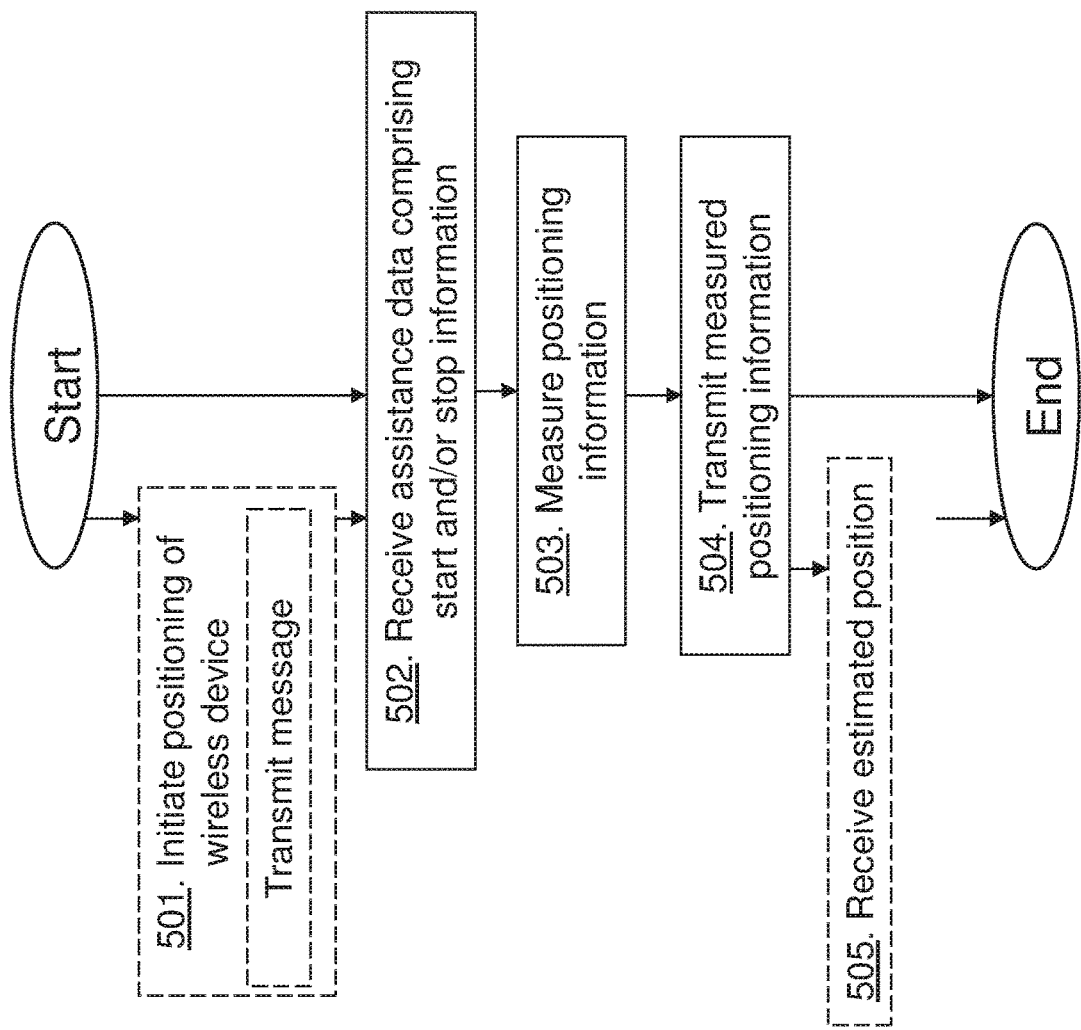
FIG. 5 is a flowchart depicting a method performed by a wireless device according to embodiments herein.

FIG. 5 illustrates embodiments from a wireless device perspective, wherein the main actions are associated with handling assistance data comprising the start and/or stop information (Actions 502 and 503). FIG. 5 depicts a method performed by the wireless device 10 for handling positioning of the wireless device in the wireless communications network. The actions do not have to be taken in the order stated below, but may be taken in any suitable order. Actions performed in some embodiments are marked with dashed boxes.

Action 501. The wireless device 10 may initiate the positioning of the wireless device by transmitting, to the location node 15 or to the radio network node 12, a message indicating positioning of the wireless device 10. Hence, the wireless device 10 may request a position estimate by transmitting a positioning request. The wireless device 10 may also include an indication whether it requests the position estimate or not in return.

Action 502. The wireless device 10 receives the assistance data from the location node 15, or the radio network node 12, in the wireless communications network. The assistance data comprises the positioning configuration comprising the start and/or stop information indicating when PRS transmissions from the radio network node 12 are started and/or ended. The assistance data may comprise start and/or stop information associated to the positioning configuration. The start and/or stop information may be a one-bit indication of PRS ON/OFF or a time representation of start and stop, an interval or in terms of time stamps. Hence, the start and/or stop information may comprise one bit indicating initiation and/or termination of PRS transmissions, or a time interval indicating initiation and termination of PRS transmissions. The start and/or stop information may be received in the assistance data on an LTE Positioning Protocol, LPP, protocol from the location node 15, or on a Radio Resource Control, RRC, protocol from the radio network node 12.

Action 503. The wireless device 10, based on the assistance data, measures positioning information of PRSs e.g. performs RSTD measurements on PRSs. The wireless device 10 may start measuring and/or stops measuring as indicated in the assistance data by the start and/or stop information. Hence, the wireless device 10 may start and/or stop performing RSTD measurement of the PRSs based on the start and/or stop information in the assistance data. The wireless device 10 may calculate position based on the measurements or transmit the measurements.

Action 504. The positioning information, i.e. the measurements or the calculated position, is transmitted, by the wireless device 10, to the location node 15 or the radio network node 12.

Action 505. The wireless device 10 may alternatively or additionally, then receive an estimated position, e.g. a position estimate, in return from the location node 15, or the radio network node 12.

Figure 6:
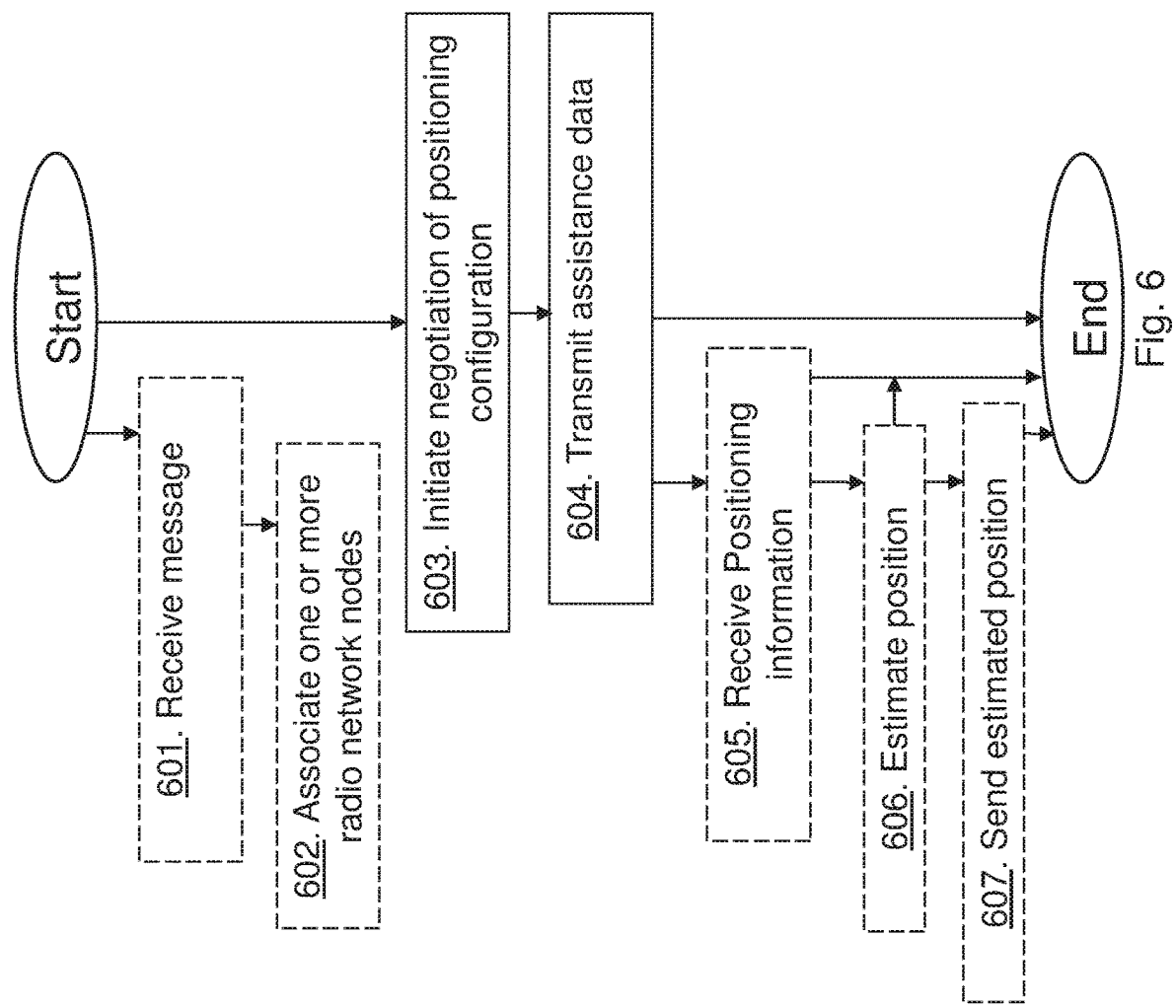
FIG. 6 is a flowchart depicting a method performed by a location node according to embodiments herein.

FIG. 6 depicts, from a location node perspective, the main actions e.g. 603 and 604 comprising negotiating the positioning configuration, which positioning configuration comprises start and/or stop information, with the radio network node 12 and sending the positioning configuration (comprising start and/or stop info) to the wireless device. FIG. 6 depicts the method performed by the location node 15 for handling positioning of the wireless device in the wireless communications network. The actions do not have to be taken in the order stated below, but may be taken in any suitable order. Actions performed in some embodiments are marked with dashed boxes.

Action 601. The location node 15 may optionally receive from the wireless device 10, the radio network node 12, or the network node 16, a message for positioning of the wireless device 10, wherein the message is a positioning request. Thus, the location node 15 may receive the positioning request from the wireless device 10, the radio network node 12 or the network node 16.

Action 602. The location node 15 may when the positioning request is granted, associate the one or more radio network nodes, such as the radio network node 12, to the positioning request.

Action 603. The location node 15 initiates a negotiation of the positioning configuration with one or more radio network nodes, wherein the positioning configuration comprises the start and/or stop information indicating when PRS transmissions from the radio network node are started and/or ended. Thus, the location node 15 may initiate the negotiation of the positioning configuration with the associated one or more radio network nodes, and optionally also considers multiple wireless devices and their positioning requirements jointly. The negotiation may comprise sending "PRS on" command over LPPa to the radio network node(s) to which the serving cell and the neighbor cells belong.

Action 604. The location node 15 transmits, once the positioning configuration has been agreed with the one or more radio network nodes, assistance data to the wireless device 10, wherein the assistance data comprises the negotiated positioning configuration comprising the start and/or stop information sends. Thus, the location node 15 sends, once the positioning configuration has been agreed with the radio network node 12, the positioning configuration as part of assistance data to the wireless device 10.

Action 605. The location node 15 may then then receive the positioning information of the wireless device e.g. from the wireless device 10, such as measurements and/or measured or calculated position.

Action 606. The location node 15 may optionally estimate the position of the wireless device 10 based on the received positioning information.

Action 607. Optionally the location node 15 may send the estimated position, e.g. position estimate, to the wireless device 10, the radio network node 12 or the network node 16.

Figure 7:
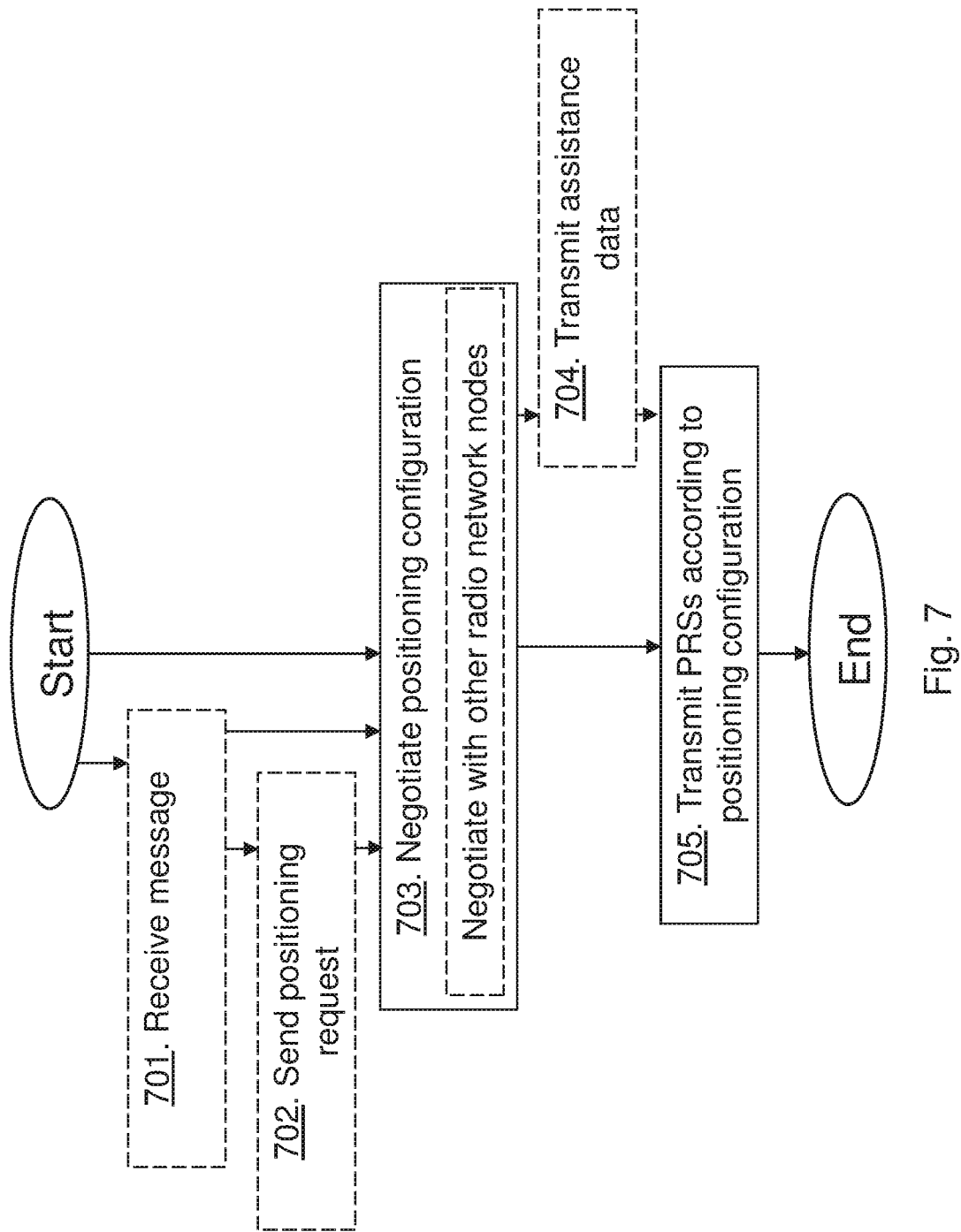
FIG. 7 is a flowchart depicting a method performed by a radio network node according to embodiments herein.

FIG. 7 provides, from a radio network node perspective, the actions (703 and 704) comprising negotiating the positioning configuration (comprising a start and/or stop information) with the location node 15 and optionally with another radio network node, and transmitting the positioning configuration (comprising start and/or stop info). FIG. 7 depicts the method performed by the radio network node 12 for handling positioning of the wireless device in the wireless communications network 1. The actions do not have to be taken in the order stated below, but may be taken in any suitable order. Actions performed in some embodiments are marked with dashed boxes.

Action 701. The radio network node may receive from the wireless device 10, the message for positioning of the wireless device 10, wherein the message is a positioning request.

Action 702. The radio network node 12 may optionally send the positioning request to the location node 15.

Action 703. The radio network node 12 negotiates, with the location node 15 and/or another radio network node, the positioning configuration. The positioning configuration comprises the start and/or stop information indicating when PRS transmissions from the radio network node are started and/or ended. The radio network node 12 may negotiate the positioning configuration with its neighboring radio network nodes. A set of neighboring radio network nodes may either be provided by the location node 15, or maintained by the radio network node 12. The negotiated positioning configuration may be sent to the location node 15 and further negotiated with the location node 15. This negotiation may comprise current status of the radio network node in terms of PRS ON/OFF, PRS configuration, and having wireless devices with positioning request. As at least three cells may be required for positioning the wireless device 10, the negotiation may be done for both reference and neighbor cells.

Action 704. The radio network node 12 may transmit, once the positioning configuration has been agreed with the location node 15 and/or the other radio network node, assistance data to the wireless device 10. The assistance data may comprise the the positioning configuration comprising the start and/or stop information.

Action 705. The radio network node 12 further transmits PRSs in accordance with the negotiated positioning configuration. Thus, once negotiated, the radio network node 12 transmits the positioning reference signals in accordance with the positioning configuration.

Figure 8:
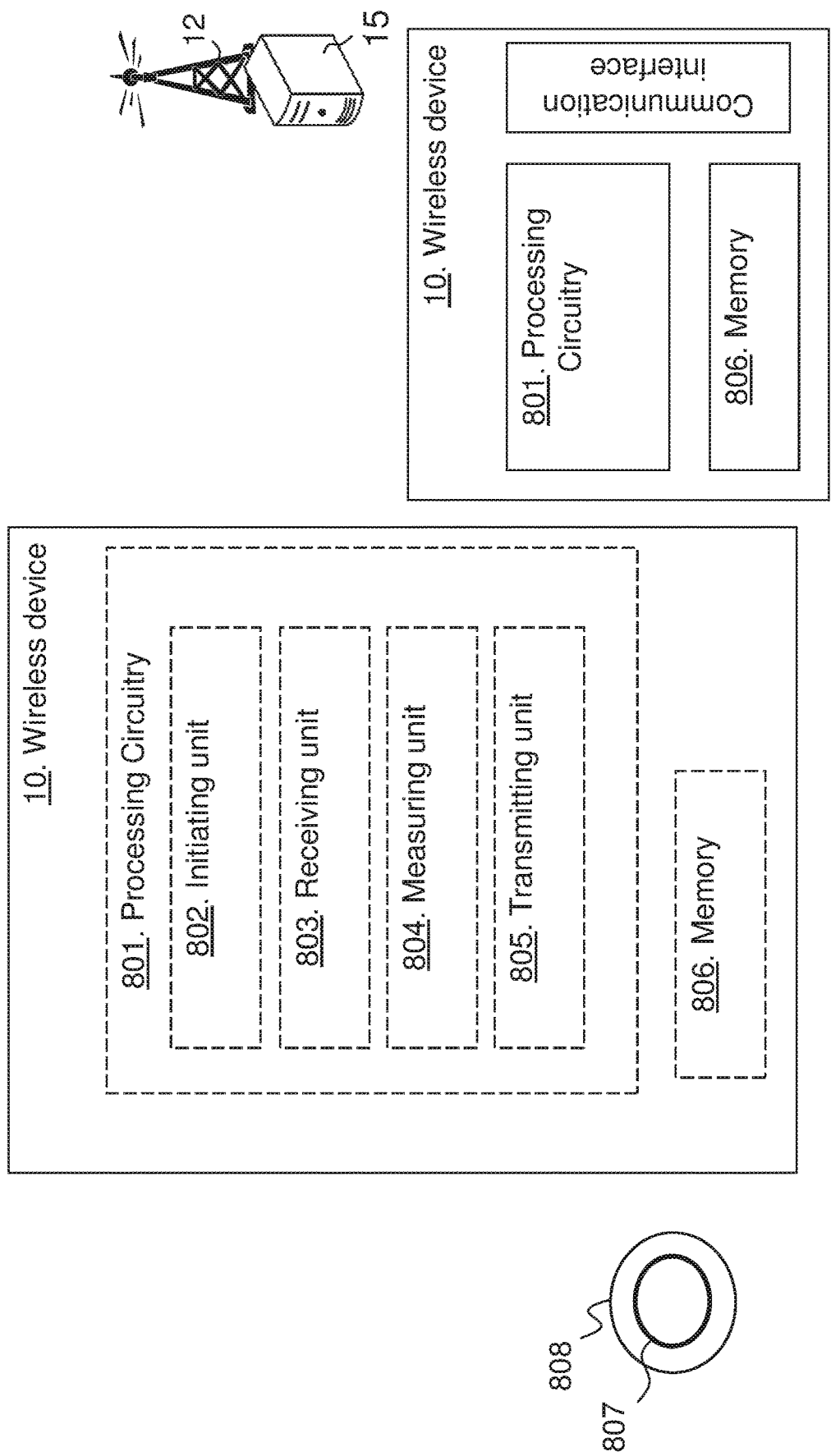
FIG. 8 is a schematic block diagram depicting a wireless device according to embodiments herein.

FIG. 8 is a schematic block diagram depicting the wireless device 10, in two embodiments, for handling positioning of the wireless device 10 in the wireless communications network 1.

The wireless device 10 may comprise a processing circuitry 801, e.g. one or more processors, configured to perform the methods herein. It should be noted that the functioning units mentioned herein may also be referred to as modules.

The wireless device may comprise an Initiating unit 802. The wireless device 10, the processing circuitry 801, and/or the initiating unit 802 may be configured to initiate the positioning of the wireless device 10 by being configured to transmit, to the location node 15 or to the radio network node 12, a message, e.g. the positioning request, indicating positioning of the wireless device 10. E.g. the wireless device 10, the processing circuitry 801, and/or the initiating unit 802 may be configured to initiate the positioning with the message to the location node 15, or to the radio network node 12. The wireless device 10, the processing circuitry 801, and/or the initiating unit 802 may further be configured to include an indication whether it requests the position estimate or not in return.

The wireless device may comprise a receiving unit 803, a receiver or a transceiver. The wireless device 10, the processing circuitry 801, and/or the receiving unit 803 is configured to receive assistance data from the location node 15, or the radio network node 12, in the wireless communications network 1. The assistance data comprises the positioning configuration comprising the start and/or stop information indicating when PRS transmissions from the radio network node are started and/or ended. Thus, the assistance data may comprise start and/or stop information associated to the positioning configuration or associated to transmissions of the positioning reference signals from the radio network node 12. The wireless device 10, the processing circuitry 801, and/or the receiving unit 803 may be configured to receive the start and/or stop information in the assistance data on the LPP protocol from the location node 15, or on the RRC protocol from the radio network node 12. The start and/or stop information may comprise one bit indicating initiation and/or termination of PRS transmissions, or a time interval indicating initiation and termination of PRS transmissions.

The wireless device may comprise a measuring unit 804. The wireless device 10, the processing circuitry 801, and/or the measuring unit 804 is configured to, based on the assistance data, measure the positioning information of the PRSs e.g. performs RSTD measurements on PRSs. The wireless device 10, the processing circuitry 801, and/or the measuring unit 804 may be configured to start measuring and/or stop measuring as indicated in the assistance data by the start and/or stop information. The wireless device 10, the processing circuitry 801, and/or the measuring unit 804 may be configured to start and/or stop performing reference signal time difference measurement of the PRSs based on the start and/or stop information in the assistance data.

The wireless device may comprise a transmitting unit 805, a transmitter or a transceiver. The wireless device 10, the processing circuitry 801, and/or the transmitting unit 805 is configured to transmit the measured positioning information, e.g. the measurements, to the location node 15 or the radio network node 12.

The wireless device 10, the processing circuitry 801, and/or the receiving unit 803 may be configured to receive the estimated position in return from the location node 15, or the radio network node 12, e.g. to receive a position estimate in return.

The wireless device 10 may comprise a communication interface e.g. transmitter, transceiver, receiver, antenna(s) etc for communicating in the wireless communications network. The wireless device 10 further comprises a memory 806 comprising one or more memory units. The memory 806 comprises instructions executable by the processing circuitry 801 to perform the methods herein when being executed in the wireless device 10. The memory 806 is arranged to be used to store e.g. information, data such as positioning configurations, start and stop information, measurements, PRS information, etc.

The methods according to the embodiments described herein for the wireless device 10 are respectively implemented by means of e.g. a computer program 807 or a computer program product, comprising instructions, i.e., software code portions, which, when executed on at least one processor, cause the at least one processor to carry out the actions described herein, as performed by the wireless device 10. The computer program 807 may be stored on a computer-readable storage medium 808, e.g. a disc or similar. The computer-readable storage medium 808, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium. Thus, the wireless device 10 may comprise the processing circuitry and the memory, said memory comprising instructions executable by said processing circuitry whereby said wireless device is operative to perform the methods herein.

Figure 9:
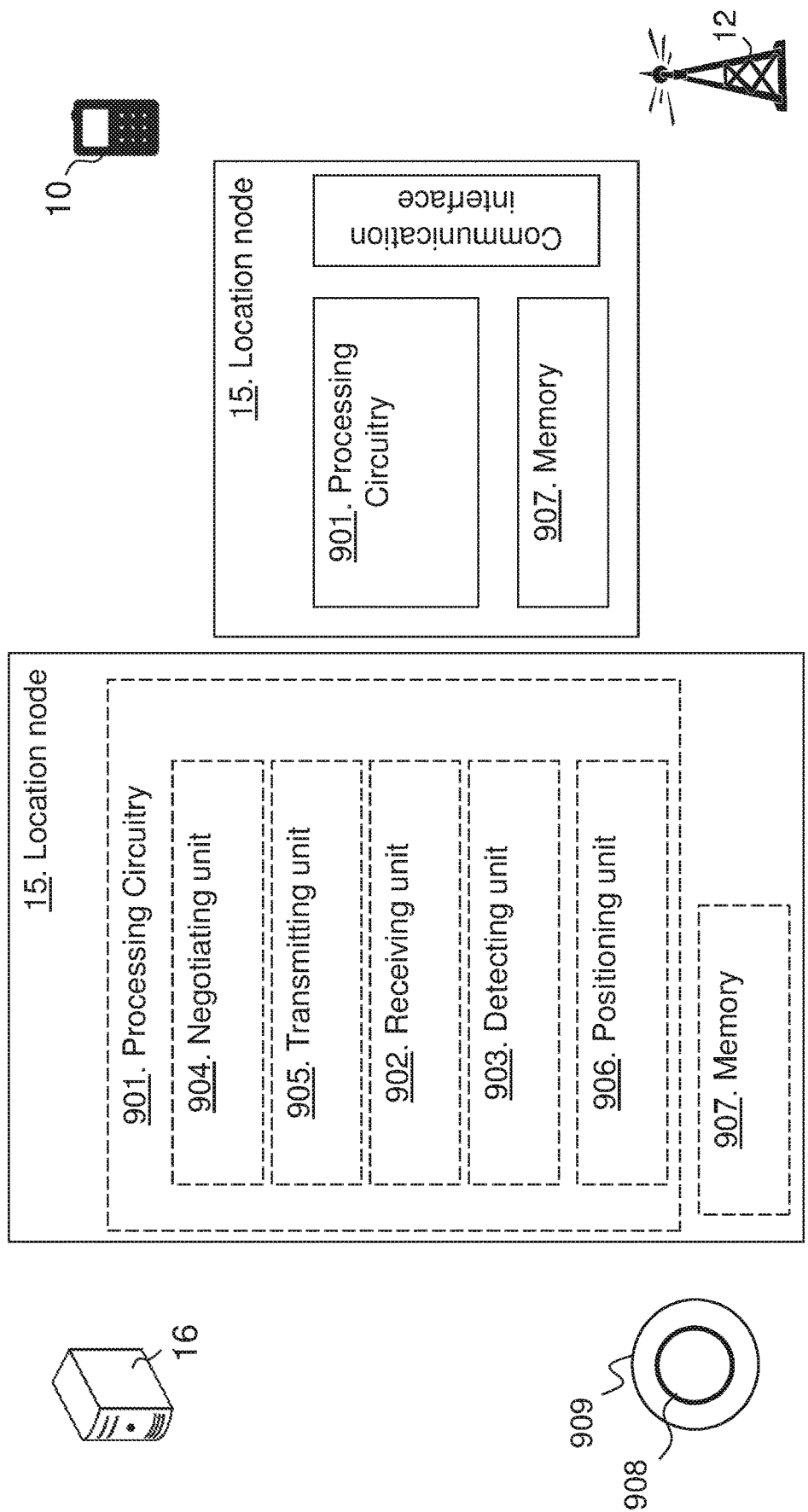
FIG. 9 is a schematic block diagram depicting a location node according to embodiments herein.

FIG. 9 is a schematic block diagram depicting the location node 15, according to two embodiments herein, for handling positioning of the wireless device in the wireless communications network.

The location node 15 may comprise a processing circuitry 901, e.g. one or more processors, configured to perform the methods herein.

The location node 15 may comprise a receiving unit 902, a receiver or a transceiver. The location node 15, the processing circuitry 901, and/or the receiving unit 902 may be configured to receive, from the wireless device 10, the radio network node 12, or the network node 16, the message for positioning of the wireless device 10, wherein the message is a positioning request, e.g. to receive a positioning request from the wireless device 10, the radio network node 12 or the network node 16.

The location node 15 may comprise a detecting unit 903. The location node 15, the processing circuitry 901, and/or the detecting unit 903 may be configured to, and when the positioning request is granted, associate the one or more radio network nodes to the positioning request. E.g. if the positioning request is granted, to associate one or more radio network nodes, such as the radio network node 12, to the positioning request. That is, find relevant radio network nodes to position the wireless device, this may be retrieved from e.g. the MME.

The location node 15 may comprise a negotiating unit 904. The location node 15, the processing circuitry 901, and/or the negotiating unit 904 is configured to initiate the negotiation of the positioning configuration with one or more radio network nodes, wherein the positioning configuration comprises the start and/or stop information indicating when PRS transmissions from the radio network node 12 are started and/or ended e.g. to initiate the negotiation of the positioning configuration with the associated one or more radio network nodes. The location node 15, the processing circuitry 901, and/or the negotiating unit 904 is optionally also configured to jointly consider multiple wireless devices and their positioning requirements. The positioning configuration comprises the start and/or stop information associated to transmissions of the positioning reference signals from the radio network node 12.

The location node 15 may comprise a transmitting unit 905, a transmitter or a transceiver. The location node 15, the processing circuitry 901, and/or the transmitting unit 905 is configured to transmit, once the positioning configuration has been agreed with the one or more radio network nodes, assistance data to the wireless device 10, wherein the assistance data comprises the negotiated positioning configuration comprising the start and/or stop information, e.g. transmit, once the positioning configuration has been agreed with the radio network node 12, the start and/or stop information as part of assistance data to the wireless device 10.

The location node 15, the processing circuitry 901, and/or the receiving unit 902 is configured to receive the positioning information of the wireless device 10 from the wireless device, such as measurements.

The location node 15 may comprise a positioning unit 906. The location node 15, the processing circuitry 901, and/or the positioning unit 906 may be configured to estimate the position of the wireless device 10 based on the received positioning information. The location node 15, the processing circuitry 901, and/or the transmitting unit 905 may be configured to send or transmit the estimated position to the wireless device 10, the radio network node 12 or the network node 16

The location node 15 may comprise a communication interface e.g. transmitter, transceiver, receiver, etc for communicating in the wireless communications network.

The location node 15 further comprises a memory 907 comprising one or more memory units. The memory 907 comprises instructions executable by the processing circuitry 901 to perform the methods herein when being executed in the location node 15. The memory 907 is arranged to be used to store e.g. information, data such as positioning configurations, position estimate, positioning information, etc.

The methods according to the embodiments described herein for the location node 15 are respectively implemented by means of e.g. a computer program 908 or a computer program product, comprising instructions, i.e., software code portions, which, when executed on at least one processor, cause the at least one processor to carry out the actions described herein, as performed by the location node 15. The computer program 908 may be stored on a computer-readable storage medium 909, e.g. a disc or similar. The computer-readable storage medium 909, having stored thereon the computer program, may comprise the instructions which, when executed on at least one processor, cause the at least one processor to carry out the actions described herein, as performed by the location node 15. In some embodiments, the computer-readable storage medium may be a non-transitory computer-readable storage medium. Thus, the location node 15 may comprise the processing circuitry and the memory, said memory comprising instructions executable by said processing circuitry whereby said location node is operative to perform the methods herein.

Figure 10:
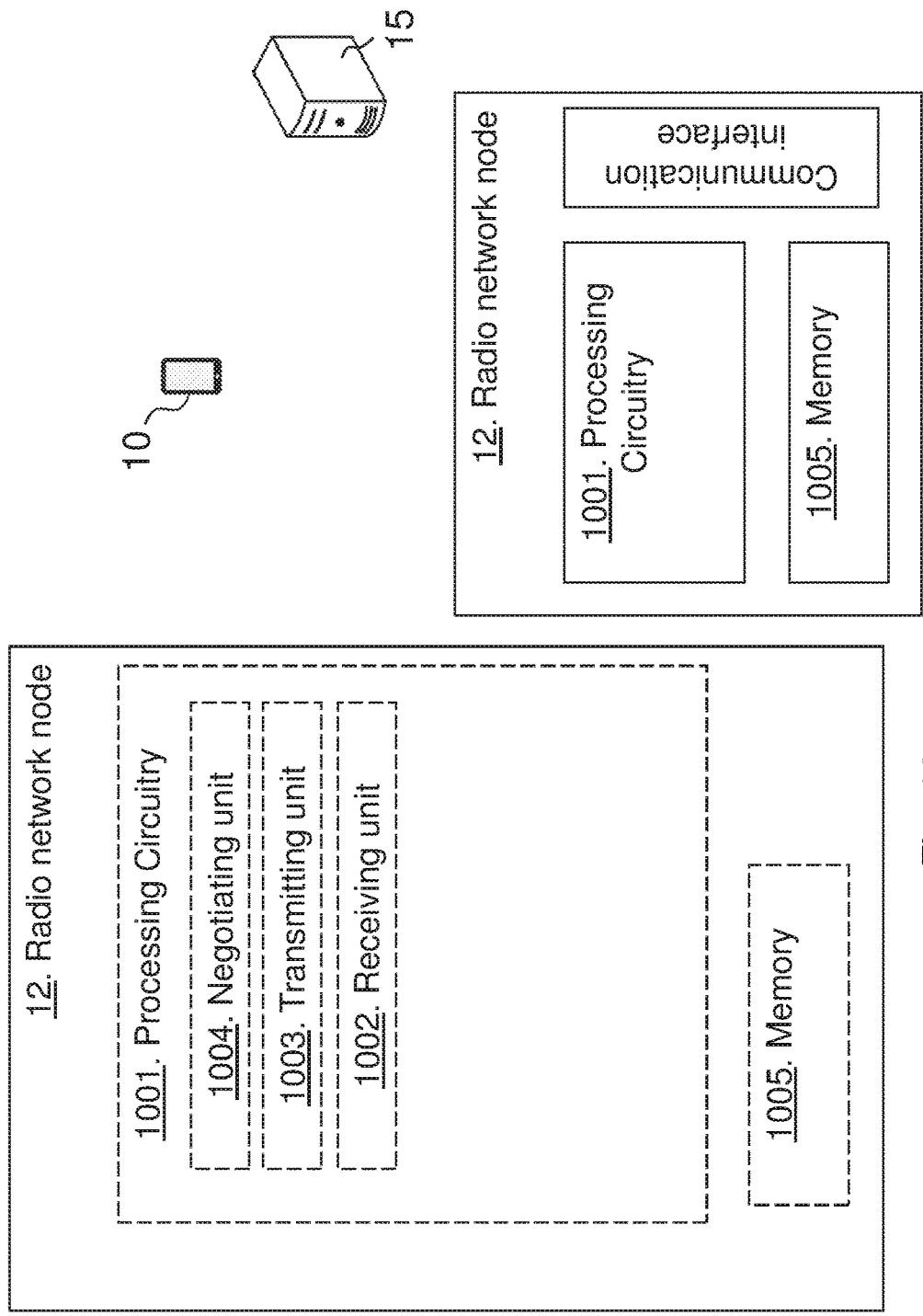
FIG. 10 is a schematic block diagram depicting a radio network node according to embodiments herein.

FIG. 10 is a schematic block diagram depicting the radio network node 12, according to two embodiments, for handling the positioning of the wireless device in the wireless communications network 1.

The radio network node 12 may comprise a processing circuitry 1001, e.g. one or more processors, configured to perform the methods herein.

The radio network node 12 may comprise a receiving unit 1002, a receiver or a transceiver. The radio network node 12, the processing circuitry 1001, and/or the receiving unit 1002 may be configured to receive from the wireless device 10, a message for positioning of the wireless device 10, wherein the message is the positioning request, e.g. to receive the positioning request from the wireless device 10 or a network node e.g. a MME or a GMLC.

The radio network node 12 may comprise a transmitting unit 1003, a transmitter or a transceiver. The radio network node 12, the processing circuitry 1001, and/or the transmitting unit 1003 may be configured to optionally send the positioning request to the location node 15.

The radio network node 12 may comprise a negotiating unit 1004. The radio network node 12, the processing circuitry 1001, and/or the negotiating unit 1004 is configured to negotiate with the location node 15 and/or another radio network node, the positioning configuration, wherein the positioning configuration comprises the start and/or stop information indicating when PRS transmissions from the radio network node 12 are started and/or ended. E.g. to negotiate the positioning configuration comprising the start and/or stop information with the location node 15. The radio network node 12 may negotiate the positioning configuration with its neighboring radio network nodes. A set of neighboring radio network nodes may either be provided by the location node 15, or maintained by the radio network node 12. The negotiated positioning configuration may be sent to the location node 15 and further negotiated with the location node 15.

The radio network node 12, the processing circuitry 1001, and/or the transmitting unit 1003 is configured to transmit the positioning reference signals in accordance with the negotiated positioning configuration e.g. to start and/or stop PRS transmissions based on the start and/or stop information. The radio network node 12, the processing circuitry 1001, and/or the transmitting unit 1003 may be configured to transmit, once the positioning configuration has been agreed with the location node 15 and/or the other radio network node, the assistance data to the wireless device 10, wherein the assistance data comprises the the positioning configuration comprising the start and/or stop information.

The radio network node 12 may comprise a communication interface e.g. transmitter, transceiver, receiver, antenna (s) etc for communicating in the wireless communications network.

The radio network node 12 further comprises a memory 1005 comprising one or more memory units. The memory 1005 comprises instructions executable by the processing circuitry 1001 to perform the methods herein when being executed in the radio network node 12. The memory 1005 is arranged to be used to store e.g. information, data such as positioning configurations, position estimates, measurements, etc.

The methods according to the embodiments described herein for the radio network node 12 are respectively implemented by means of e.g. a computer program 1006 or a computer program product, comprising instructions, i.e., software code portions, which, when executed on at least one processor, cause the at least one processor to carry out the actions described herein, as performed by the radio network node 12. The computer program 1006 may be stored on a computer-readable storage medium 1007, e.g. a disc or similar. The computer-readable storage medium 1007, having stored thereon the computer program, may comprise the instructions which, when executed on at least one processor, cause the at least one processor to carry out the actions described herein, as performed by radio network node 12. In some embodiments, the computer-readable storage medium may be a non-transitory computer-readable storage medium. Thus, the radio network node 12 may comprise the processing circuitry and the memory, said memory comprising instructions executable by said processing circuitry whereby said radio network node is operative to perform the methods herein.

As will be readily understood by those familiar with communications design, that functions means, modules or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device, location node or radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It is herein shown a method performed by a wireless device for handling positioning of the wireless device in a wireless communications network. The wireless device receives assistance data from a location node, or a radio network node, in the wireless communications network. The assistance data comprises start and/or stop information associated to the positioning configuration indicating when PRS transmissions from the radio network node is started and/or ended. The start and/or stop info may be transmitted in the assistance data on for example the LTE Positioning Protocol (LPP) protocol from the location node to the wireless device, or it can also be reported via for example Radio Resource Control (RRC) by the radio network node. The start and/or stop info may be one bit indicating initiation and/or termination of PRS transmissions, or a time interval indicating initiation and termination of PRS transmissions. The wireless device measures, based on the assistance data, positioning information on PRSs, i.e. the wireless device starts and/or stops measuring PRSs based on the start and/or stop info in the assistance data. The wireless device further transmits positioning information, i.e. the measurements, to the location node or the radio network node.

It is further shown a method performed by a location node for handling positioning of a wireless device in a wireless communications network. The location node initiates a negotiation of a positioning configuration with one or more radio network nodes. The positioning configuration comprises a start and/or stop information associated to transmissions of the positioning reference signals from the radio network node. The location node may then transmit, once the positioning configuration has been agreed with the one or more radio network nodes, the start and/or stop information as part of assistance data to the wireless device.

Furthermore, it is shown a method performed by a radio network node. The radio network node negotiates, with a location node, a positioning configuration comprising start and/or stop information indicating when PRS transmissions from the radio network node is started and/or ended. The radio network node may then transmit, once the positioning configuration has been agreed with the location node, the start and/or stop information as part of assistance data to the wireless device. The radio network node 12 may further then transmit PRSs in accordance with the negotiated positioning configuration.

Furthermore, it is shown a wireless device, a radio network node and a location node configured to perform the methods herein.

Embodiments herein enable an positioning, e.g. OTDOA positioning, for e.g. NB-IoT devices with a function switching on and off PRS transmissions in the serving cells. Transmitting PRSs for OTDOA occupies radio resources and for this reason, it is reasonable to only transmit PRSs when there is the need for OTDOA positioning measurements. For NB-IoT, to obtain sufficient accuracy it may be necessary to transmit PRSs in a huge number of DL subframes, which would consume a significant amount of DL resources—much more so than for legacy LTE.

Because of this, for NB-IoT it seems even more critical than for legacy LTE to be able to switch on PRS transmission only when a positioning measurement is requested, and switch it off immediately after.

Observation 1: For NB-IoT OTDOA positioning it seems even more critical than for legacy LTE to be able to transmit PRSs only when strictly needed to avoid wasting radio resources.

Configuring, enabling and disabling PRS transmission in radio network nodes can be typically performed via OAM, which may also coordinate the E-SMLC configuration. A typical "latency" value for positioning measurements is expected to be 10-20 s in most cases. This should include PRS configuration, UE configuration, and UE measurement reporting. The typical "reaction time" for OAM action into the RAN, when taken into account for the above NB-IoT use, may be too slow, resulting in either a delay in positioning measurements, or in a waste of radio resources.

Observation 2: For NB-IoT positioning, OAM action to configure and switch on/off PRS transmission may be too slow, leading either to a delay in positioning measurements, or in a waste of radio resources.

PRS configuration would probably not need to be changed on the fly. The main impacting factors (typically network deployment and NB-IoT device characteristics) may be assumed to be reasonably under operator control. PRS configuration may thus continue to be handled in a semi-static way by OAM.

Observation 3: It seems PRS configuration does not need to change on the fly, so it seems reasonable to continue to assume that it is handled in a semi-static way by OAM.

It seems appropriate to consider the possibility to switch on or off PRS transmission as needed through network signaling, using pre-configured PRS settings according to the above. A possible procedure may be:

101. The location node 15, e.g. E-SMLC, decides which cells to include in a neighbor list;
102. The location node 15 sends "PRS on" command over LPPa to the radio network node(s) such as radio network node such as eNB(s) to which the serving cell and the neighbor cells belong (this could include the "PRS start/stop" information);
103. The radio network nodes acknowledge the request;
104. The location node 15 sends Provide Assistance Data to the wireless device 10 (including the appropriate PRS configuration, including the "PRS start/stop" information);
105. The location node 15 may send Request Location Information to the wireless device 10 (possibly including the "PRS start/stop" information);
106. The wireless device 10 sends Provide Location Information to the location node 15;

107. (Optional) The location node 15 may send "PRS off" command to the radio network nodes (in case "PRS stop" was not sent in step 102).

If the "PRS stop" is sent in step 102, there is no need for step 107.

For steps 102 and 103 there could be two possible options:
a. Reuse the current LPPa OTDOA Information Exchange procedure, with an appropriate extension, e.g. "PRS start time"/"PRS stop time" IE;
b. Introduce a dedicated procedure, e.g. "OTDOA PRS Transmission Start/Stop".

For option a, if the radio network node receives an OTDOA INFORMATION REQUEST message with the new extension PRS start time and/or PRS stop time IE, it considers the included information as PRS transmission start/stop time, and then responds according to current specification. For option b, the impact on LPPa may be higher.

To obtain sufficient accuracy for NB-IoT OTDOA positioning it may be necessary to transmit PRSs only on demand. Current handling by OAM may be too slow for the required positioning measurement latency, leading to delays or DL resource waste. It seems appropriate to consider e.g. LPPa signaling support for on-demand PRS transmission for OTDOA for NB-IoT. Embodiments relate to a procedure for e.g. NB-IoT OTDOA positioning, which switches PRS transmission on and off on demand.

In a first embodiment a wireless device is provided for handling positioning of the wireless device in a wireless communications network, wherein the wireless device comprises processing circuitry and a memory, said memory comprising instructions executable by said processing circuitry whereby said wireless device is operative to:
  receive assistance data from a location node, or a radio network node, in the wireless communications network, wherein the assistance data comprises a positioning configuration comprising a start and/or stop information indicating when positioning reference signal, PRS, transmissions from the radio network node are started and/or ended;
  measure, based on the assistance data, a positioning information of PRSs; and to
  transmit the measured positioning information to the location node or the radio network node.

It is herein disclosed a second embodiment being the wireless device according to the first embodiment, wherein the wireless device is further operative to measure the positioning information by being configured to start and/or stop performing reference signal time difference measurement of the PRSs based on the start and/or stop information in the assistance data.

It is herein disclosed a third embodiment being the wireless device according to the first and/or the second embodiment, wherein the wireless device is operative to receive the start and/or stop information in the assistance data on an LTE Positioning Protocol, LPP, protocol from the location node, or on a Radio Resource Control, RRC, protocol from the radio network node.

It is herein disclosed a fourth embodiment being the wireless device according to the first, second and/or the third embodiment, wherein the start and/or stop information comprises one bit indicating initiation and/or termination of PRS transmissions, or a time interval indicating initiation and termination of PRS transmissions.

It is herein disclosed a fifth embodiment being the wireless device according to the first, second, third and/or the fourth embodiment, wherein the wireless device is further operative to initiate a positioning of the wireless device by being operative to transmit, to the location node or to the radio network node, a message indicating positioning of the wireless device.

It is herein disclosed a sixth embodiment being the wireless device according to the first, second, third, fourth and/or the fifth embodiment, wherein the wireless device is further operative to receive an estimated position in return from the location node, or the radio network node.

It is herein disclosed another first embodiment disclosing a location node for handling positioning of a wireless device in a wireless communications network, wherein the location node comprises processing circuitry and a memory, said memory comprising instructions executable by said processing circuitry whereby said location node is operative to:
  initiate a negotiation of a positioning configuration with one or more radio network nodes, wherein the positioning configuration comprises a start and/or stop information indicating when positioning reference signal, PRS, transmissions from a radio network node are started and/or ended; and to
  transmit, once the positioning configuration has been agreed with the one or more radio network nodes, assistance data to the wireless device, wherein the assistance data comprises the negotiated positioning configuration comprising the start and/or stop information.

It is herein disclosed another second embodiment being the location node according to the other first embodiment, wherein said location node is operative to
  receive from the wireless device, positioning information of the wireless device.

It is herein disclosed another third embodiment being the location node according to the other second embodiment, wherein said location node is further operative to
  estimate a position of the wireless device based on the received positioning information; and to
  send the estimated position to the wireless device, a radio network node or a network node.

It is herein disclosed a another fourth embodiment being the location node according to the other first, second and/or the third embodiment, wherein said location node is further operative to
  receive, from the wireless device, the radio network node, or a network node, a message for positioning of the wireless device, wherein the message is a positioning request; and when the positioning request is granted is operative to
  associate the one or more radio network nodes to the positioning request.

In a further first embodiment a radio network node is provided for handling positioning of a wireless device in a wireless communications network, wherein the radio network node comprises processing circuitry and a memory, said memory comprising instructions executable by said processing circuitry whereby said radio network node is operative to:
  negotiate with a location node and/or another radio network node, a positioning configuration, wherein the positioning configuration comprises a start and/or stop information indicating when positioning reference signal, PRS, transmissions from the radio network node are started and/or ended; and to
  transmit positioning reference signals in accordance with the negotiated positioning configuration.

It is herein disclosed a further second embodiment being the radio network node according to the further first embodiment, wherein said radio network node is operative to
 transmit, once the positioning configuration has been agreed with the location node and/or the other radio network node, assistance data to the wireless device, wherein the assistance data comprises the the positioning configuration comprising the start and/or stop information.

It is herein disclosed a further third embodiment being the radio network node according to the further first and/or the second embodiment, wherein said radio network node is further operative to
 receive from the wireless device, a message for positioning of the wireless device, wherein the message is a positioning request.

It is herein disclosed a further fourth embodiment being the radio network node according to the further third embodiment, wherein said radio network node is further operative to send the positioning request to the location node.

It is herein further disclosed an additional first embodiment disclosing a wireless device for handling positioning of the wireless device in a wireless communications network, wherein the wireless device comprises:
 a receiving unit configured to receive assistance data from a location node, or a radio network node, in the wireless communications network, wherein the assistance data comprises a positioning configuration comprising a start and/or stop information indicating when positioning reference signal, PRS, transmissions from the radio network node are started and/or ended;
 a measuring unit configured to measure, based on the assistance data, a positioning information of PRSs; and
 a transmitting unit configured to transmit the measured positioning information to the location node or the radio network node.

It is herein disclosed an additional second embodiment being the wireless device according to the additional first embodiment, wherein the measuring unit is configured to measure the positioning information by being configured to start and/or stop performing reference signal time difference measurement of the PRSs based on the start and/or stop information in the assistance data.

It is herein disclosed an additional third embodiment being the wireless device according to the additional first and/or second embodiment, wherein the receiving unit is configured to receive the start and/or stop information in the assistance data on an LTE Positioning Protocol, LPP, protocol from the location node, or on a Radio Resource Control, RRC, protocol from the radio network node.

It is herein disclosed an additional fourth embodiment being the wireless device according to the additional first, second and/or third embodiment, wherein the start and/or stop information comprises one bit indicating initiation and/or termination of PRS transmissions, or a time interval indicating initiation and termination of PRS transmissions.

It is herein disclosed an additional fifth embodiment being the wireless device according to the additional first, second, third and/or fourth embodiment, comprising an initiating unit configured to initiate a positioning of the wireless device by being configured to transmit, to the location node or to the radio network node, a message indicating positioning of the wireless device.

It is herein disclosed an additional sixth embodiment being the wireless device according to the additional first, second, third, fourth and/or fifth embodiment, wherein the receiving unit is configured to receive an estimated position in return from the location node, or the radio network node.

It is herein disclosed a location node in an additional other first embodiment for handling positioning of a wireless device in a wireless communications network, wherein the location node comprises a negotiating unit configured to initiate a negotiation of a positioning configuration with one or more radio network nodes, wherein the positioning configuration comprises a start and/or stop information indicating when positioning reference signal, PRS, transmissions from a radio network node are started and/or ended; and comprising a transmitting unit configured to transmit, once the positioning configuration has been agreed with the one or more radio network nodes, assistance data to the wireless device, wherein the assistance data comprises the negotiated positioning configuration comprising the start and/or stop information.

It is herein disclosed in an additional other second embodiment the location node according to the additional other first embodiment, comprising a receiving unit configured to receive from the wireless device, positioning information of the wireless device.

It is herein disclosed in an additional other third embodiment the location node according to the additional other second embodiment comprising a positioning unit configured to estimate a position of the wireless device based on the received positioning information; and the transmitting unit configured to send the estimated position to the wireless device, a radio network node or a network node.

It is herein disclosed in an additional other fourth embodiment the location node according to the additional other first, second and/or third embodiment comprising a receiving unit configured to receive, from the wireless device, the radio network node, or a network node, a message for positioning of the wireless device, wherein the message is a positioning request; and when the positioning request is granted a detecting unit is configured to associate the one or more radio network nodes to the positioning request.

It is herein disclosed in an additional further first embodiment disclosing a radio network node for handling positioning of a wireless device in a wireless communications network, wherein the radio network node comprises a negotiating unit configured to negotiate with a location node and/or another radio network node, a positioning configuration, wherein the positioning configuration comprises a start and/or stop information indicating when positioning reference signal, PRS, transmissions from the radio network node are started and/or ended; and a transmitting unit configured to transmit positioning reference signals in accordance with the negotiated positioning configuration.

It is herein disclosed in an additional further second embodiment the radio network node according to the additional further first embodiment, wherein the transmitting unit is configured to transmit, once the positioning configuration has been agreed with the location node and/or the other radio network node, assistance data to the wireless device, wherein the assistance data comprises the the positioning configuration comprising the start and/or stop information.

It is herein disclosed in an additional further third embodiment the radio network node according to the additional further first and/or second embodiment, further comprising a receiving unit configured to receive from the wireless device, a message for positioning of the wireless device, wherein the message is a positioning request.

It is herein disclosed in an additional further fourth embodiment the radio network node according to the additional further third embodiment, wherein the transmitting unit is further configured to send the positioning request to the location node.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling positioning of the wireless device in a wireless communications network, comprising:
receiving assistance data from a location node or a radio network node, in the wireless communications network, once the location node has initiated negotiation and agreed to a positioning configuration with one or more radio network nodes, wherein the assistance data comprises the positioning configuration comprising at least one of a start information and a stop information, the start information indicating when positioning reference signal, PRS, transmissions from the radio network node are enabled, the stop information indicating when PRS transmissions from the radio network node are disabled;
measuring, based on the assistance data, a positioning information of PRSs; and transmitting the measured positioning information to the location node or the radio network node.

2. The method according to claim 1, wherein measuring the positioning information comprises at least one of enabling and disabling performance of reference signal time difference measurement of the PRSs based on at least one of the start information and the stop information in the assistance data.

3. The method according to claim 1, wherein the at least one of the start information and the stop information is received in the assistance data on an LTE Positioning Protocol, LPP, protocol from the location node, or on a Radio Resource Control, RRC, protocol from the radio network node.

4. The method according to claim 1, wherein the at least one of the start information and the stop information comprises one bit indicating at least one of initiation of PRS transmissions, termination of PRS transmissions, and a time interval indicating initiation and termination of PRS transmissions.

5. The method according to claim 1, further comprising initiating a positioning of the wireless device by transmitting, to the location node or to the radio network node, a message indicating positioning of the wireless device.

6. A method performed by a location node for handling positioning of a wireless device in a wireless communications network, the method comprising:
initiating a negotiation of a positioning configuration with one or more radio network nodes, wherein the positioning configuration comprises at least one of a start information and a stop information, the start information indicating when positioning reference signal, PRS, transmissions from a radio network node are enabled, the stop information indicating when PRS transmissions form the radio network node are disabled; and
transmitting, once the positioning configuration has been agreed with the one or more radio network nodes, assistance data to the wireless device, wherein the assistance data comprises the negotiated positioning configuration comprising at least one of the start information and the stop information.

7. A wireless device for handling positioning of the wireless device in a wireless communications network, wherein the wireless device is configured to:
receive assistance data from a location node or a radio network node, in the wireless communications network, once the location node has initiated negotiation and agreed to a positioning configuration with one or more radio network nodes, wherein the assistance data comprises the positioning configuration comprising at least one of a start information and a stop information, the start information indicating when positioning reference signal, PRS, transmissions from the radio network node are enabled, the stop information indicating when PRS transmissions from the radio network node are disabled;
measure, based on the assistance data, a positioning information of PRSs; and to
transmit the measured positioning information to the location node or the radio network node.

8. The wireless device according to claim 7, wherein the wireless device is configured to measure the positioning information by at least one of being configured to enable performance of reference signal time difference measurement of the PRSs based on the start information in the assistance data and being configured to disable performance of reference signal time difference measurement of the PRSs based on the stop information in the assistance data.

9. The wireless device according to claim 7, wherein the wireless device is configured to receive at least one of the start information and the stop information in the assistance data on an LTE Positioning Protocol, LPP, protocol from the location node, or on a Radio Resource Control, RRC, protocol from the radio network node.

10. The wireless device according to claim 7, wherein the at least one of the start information and the stop information comprises one bit indicating at least one of initiation of PRS transmissions, termination of PRS transmissions, and a time interval indicating initiation and termination of PRS transmissions.

11. The wireless device according to claim 7, wherein the wireless device is further configured to initiate a positioning of the wireless device by being configured to transmit, to the location node or to the radio network node, a message indicating positioning of the wireless device.

12. The wireless device according to claim 7, wherein the wireless device is configured to receive an estimated position in return from at least one of the location node and the radio network node.

13. A location node for handling positioning of a wireless device in a wireless communications network, wherein the location node is configured to:
initiate a negotiation of a positioning configuration with one or more radio network nodes, wherein the positioning configuration comprises at least one of a start information and a stop information, the start information indicating when positioning reference signal, PRS, transmissions from a radio network node are enabled, the stop information indicating when PRS transmissions from the radio network node are disabled; and to
transmit, once the positioning configuration has been agreed with the one or more radio network nodes, assistance data to the wireless device, wherein the assistance data comprises the negotiated positioning configuration comprising the at least one of the start and stop information.

14. The location node according to claim 13, wherein the location node is further configured to
receive from the wireless device, positioning information of the wireless device.

15. The location node according to claim 14, wherein the location node is configured to
estimate a position of the wireless device based on the received positioning information; and to
send the estimated position to the wireless device, a radio network node, or a network node.

16. The location node according to claim 13, wherein the location node is further configured to
receive, from the wireless device, the radio network node, or a network node, a message for positioning of the wireless device, wherein the message is a positioning request; and
when the positioning request is granted the location node is configured to associate the one or more radio network nodes to the positioning request.

17. A radio network node for handling positioning of a wireless device in a wireless communications network, wherein the radio network node is configured to:
negotiate with at least one of a location node and another radio network node, a positioning configuration, wherein the positioning configuration comprises at least one of a start information and a stop information, the start information indicating when positioning reference signal, PRS, transmissions from the radio network node are enabled, the stop information indicating when PRS transmissions from the radio network are disabled;
transmit positioning reference signals in accordance with the negotiated positioning configuration; and wherein the negotiation is initiated by the location node.

18. The radio network node according to claim 17, wherein the radio network node is further configured to
transmit, once the positioning configuration has been agreed with at least one of the location node and the other radio network node, assistance data to the wireless device, wherein the assistance data comprises the positioning configuration comprising at least one of the start information and the stop information.

19. The radio network node according to claim 17, wherein the radio network node is further configured to receive from the wireless device, a message for positioning of the wireless device, wherein the message is a positioning request.

20. The radio network node according to claim 19, wherein the radio network node is further configured to send the positioning request to the location node.

* * * * *